United States Patent
Bhattacharjee et al.

(10) Patent No.: US 7,516,117 B2
(45) Date of Patent: Apr. 7, 2009

(54) METHOD FOR ACCELERATING RANGE QUERIES USING PERIODIC MONOTONIC PROPERTIES OF NON-MONOTONIC FUNCTIONS

(75) Inventors: Bishwaranjan Bhattacharjee, Yorktown Heights, NY (US); Timothy Ray Malkemus, Round Rock, TX (US); Ioana Roxana Stanoi, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 11/509,050

(22) Filed: Aug. 24, 2006

(65) Prior Publication Data

US 2008/0059410 A1    Mar. 6, 2008

(51) Int. Cl.
*G06F 7/00* (2006.01)
*G06F 17/30* (2006.01)

(52) U.S. Cl. .............................. 707/2; 707/3

(58) Field of Classification Search .................. 707/2, 707/3
See application file for complete search history.

(56) References Cited

U.S. PATENT DOCUMENTS

| | | | |
|---|---|---|---|
| 6,272,487 B1* | 8/2001 | Beavin et al. | 707/2 |
| 2003/0195881 A1* | 10/2003 | Koo et al. | 707/5 |
| 2007/0226245 A1* | 9/2007 | Murthy | 707/102 |

* cited by examiner

*Primary Examiner*—James Trujillo
*Assistant Examiner*—Jorge A Casanova
(74) *Attorney, Agent, or Firm*—McGinn IP Law Group, PLLC; Stephen C. Kaufman, Esq.

(57) ABSTRACT

A method for accelerating range queries using periodic monotonic properties of non-monotonic functions including mapping a base column x to an existing index on a column y that is correlated with column x through a periodic piecewise monotonic function F(x), rewriting an index construction statement to force the existing index on column y to track a periodic piecewise monotonic property by assigning identical values of F(x) to different periods to different ranges to create an annotated index, and rewriting range queries over the annotated index on F(x) by modifying a derived predicate.

1 Claim, 4 Drawing Sheets

METHOD FOR ACCELERATING RANGE QUERIES USING PERIODIC MONOTONIC PROPERTIES OF NON-MONOTONIC FUNCTIONS

BACKGROUND OF THE INVENTION

1. Field of the Invention

This invention generally relates to optimization of range queries in relational databases, and, more particularly, to a method for accelerating range queries using periodic monotonic properties of non-monotonic functions.

2. Description of the Related Art

Indexes are used in most database management systems to speed up lookups of point queries as well as lookups of range queries, which are limited by a lower and upper bound. They are defined for one or multiple columns. The multi-dimensional clustering (MDC) works, for example, as in DB2® manufactured by IBM Corporation.

The ability to cluster on column expression is useful for rolling up dimensions to a coarser granularity. Examples include rolling up an address to a geographic location or region, rolling up a date to a week, month, or year. Generated columns are used to implement the rolling up of dimensions.

For example, to create a table clustered on one base column and two column expressions in DB2® the following commands may be used:

CREATE TABLE T1(c1 DATE, c2 INT, c3 INT, c4 DOUBLE, c5 DOUBLE GENERATED ALWAYS AS (c3+c4), // c5 is an expression based on columns c3 and c4, C6 INT GENERATED ALWAYS AS (MONTH(C1))) //c6 rolls up column c1 to a coarser granularity in time ORGANIZE BY DIMENSIONS (c2, c5, c6)

The above statement will cluster the table based on the values in columns c2, c5, and c6.

The concept of multi-dimensional clustering has been used, for example, in DB2® as MDC. An example of MDC clustering is given in FIG. 1.

When a query selects values from a column x, then the index pre-defined on x is used for optimization. If the query selects values from a column x that does not have an index, the index on a column y that is derived from x can be used if, and only if, there is the guarantee that columns x and y are monotonic with respect to one another. Currently, if the two columns are not monotonic with respect to each other, then the conventional approach cannot be used.

Monotonicity is currently exploited to reduce the number of columns that need to be indexed. Since there is a considerable amount of space that needs to be allocated for each index and for each new dimension, this reduction has obvious advantages. Consider a base column x and a derived column y=F(x) where F(x) is monotonic. Then a range query over x (the range is $x_i \ldots x_j$) can be answered by performing a range query over y (over the range $F(x_i) \ldots F(x_j)$) which will retrieve the same blocks of data as the user query. Thus, if the values of a derived column y behave monotonically with respect to the values in a column x, then the index on x can be used to answer range queries on column y, and vice versa.

There are many instances where two columns are piecewise monotonic, meaning that if split into intervals, their values are monotonic over these intervals, although the type of monotonicity, increasing or decreasing, may change from one interval to another. Such a condition is referred to as periodic piecewise monotonic (PPM). However, some functions are observed to be PPM without the explicit knowledge of the user, in which case the manual approach would not even be feasible.

SUMMARY OF THE INVENTION

In view of the foregoing and other exemplary problems, drawbacks, and disadvantages of the conventional methods and structures, an exemplary feature of the present invention is to provide a method for accelerating range queries using periodic monotonic properties of non-monotonic functions in order to speedup queries on a column x by using the annotated existing index on column y, if the derivation function of y based on x is PPM. In this manner, the invention provides an automatic way of implementing such optimizations, including query re-writes.

The present invention permits MDC to also benefit from recognizing and using the properties of periodic piecewise monotonic (PPM) functions. Currently, MDC takes advantage of only a subset of monotonic function to rewrite range queries over derived columns.

In a first exemplary aspect of the present invention, a method for accelerating range queries using periodic monotonic properties of non-monotonic functions includes mapping a base column x to an existing index on a column y that is correlated with column x through a periodic piecewise monotonic function F(x), rewriting an index construction statement to force the existing index on column y to track a periodic piecewise monotonic property by assigning identical values of F(x) to different periods to different ranges to create an annotated index, and rewriting range queries over the annotated index on F(x) by modifying a derived predicate.

Taking advantage of monotonicity between base columns and derived columns is currently restricted to monotonic functions, but not to functions that are PPM. The present invention takes advantage of PPM derivation functions to avoid the need to maintain indexes over both the base columns and derived columns by maintaining only one annotated index.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
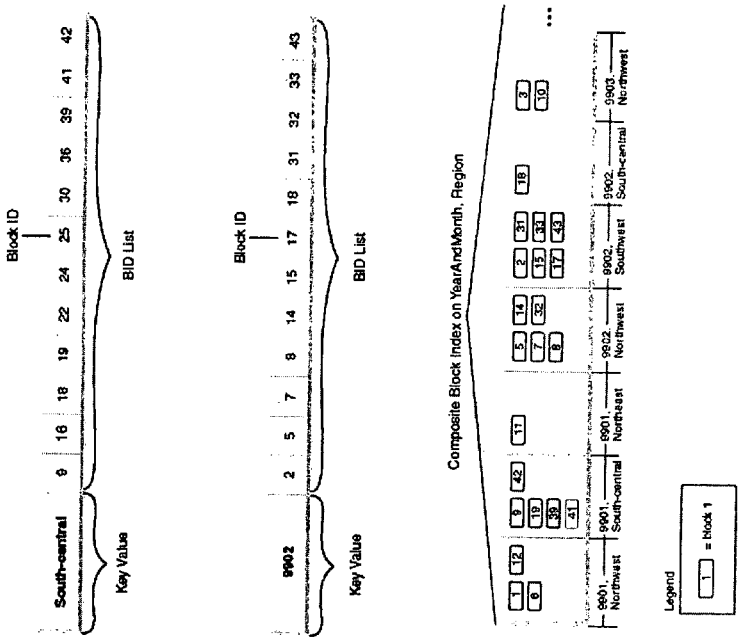
FIG. 1 is an exemplary schematic diagram of multi-dimensional clustering.
Figure 1:
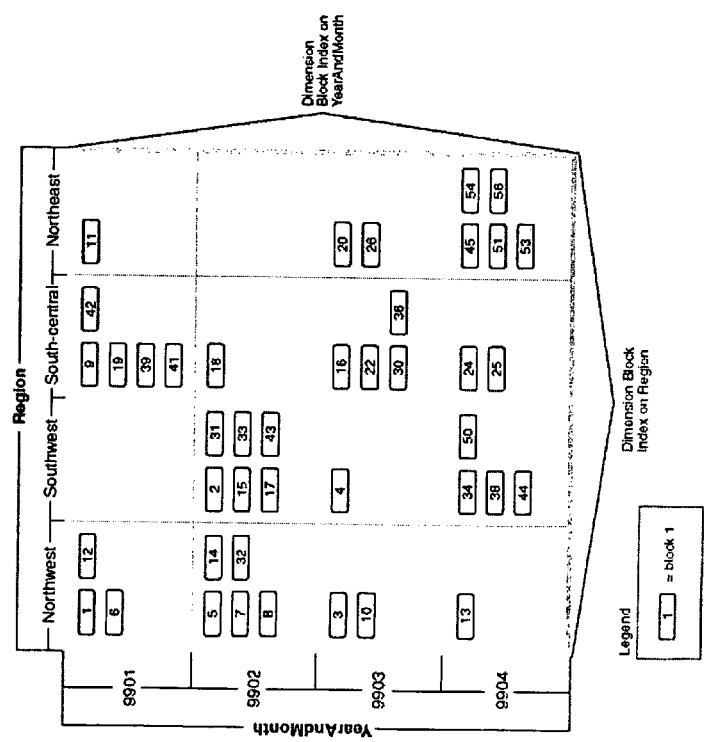

Referring now to the drawings, and more particularly to FIGS. 1-4, there are shown exemplary embodiments of the system and method according to the present invention.

For the purpose of this application, a PPM function F(x) is a piecewise periodic monotonic function that has the property that, for some period p, when x is split into consecutive intervals $I_i$ of the same size/period p, F(x) is monotonic with respect to x for each Ii. F(x) can be monotonic increasing for some interval Ii, and monotonic decreasing for another interval Ij. The idea is to force a composite index to assign values into blocks based on both the generated expression and its periodicity.

There are several known functions considered to be guaranteed to be PPM such as:

| PPM FUNCTION | PERIOD SIZE |
|---|---|
| COS | $\pi/2$ |
| COT | $\pi/2$ |
| DAYOFWEEK | 7 |
| DAYOFYEAR | year |
| HOUR | 24 |
| QUARTER | 4 |
| MOD | x |
| MONTH | year |
| SIN | $\pi/2$ |
| TAN | $\pi/2$ |

For these functions, the size of the period is known. Another way to determine if a derivation function is PPM, is if the user explicitly provides this information. Finally, by tracking the values of a base and derived column, the PPM relationship can be verified, and the period sized can be calculated.

Unlike monotonic derivation functions where only distinct values on the base column have the same value on the derived column, in the case of PPM functions, two non-consecutive values of the base columns can map to the same value on the derived column.

For example:
... MONTH (date('99/12/08'))=12
MONTH (date('00/01/18'))=1
MONTH (date('00/02/24'))=2
MONTH (date('02/01/07'))=1

For different dates ('00/01/18' and '02/01/07') the value on the derived column will be the same MONTH( )=1.

If only an index on the derived column (MONTH) is accessed, then a query whose predicate is based on the base column (date) will use the existing index on MONTH and may retrieve a superset of the correct answer tuples. Then, only by retrieving the tuples and examining them for the date values, the system can filter out the incorrect tuples and return the final answer. For correctness, an index over MONTH could be built that is annotated with the periodicity number. The periodicity number is obtained by dividing the value of the base column of a tuple by the size of the period p that is characteristic to the PPM derivation function.

PPM functions can be classified into the ones that have a pre-defined number of periods and the ones where this number is undefined. If the allowed range for trigonometric functions is between o and $2\pi$, then the following have a pre-defined number of periods:

| COS | $p = \pi/2$ |
|---|---|
| COT | $p = \pi/2$ |
| SIN | $p = \pi/2$ |
| TAN | $p = \pi/2$ |

The period is actually $\pi$, but for uniformity (since their periods do not overlap), $\pi/2$ is used.

Figure 2:
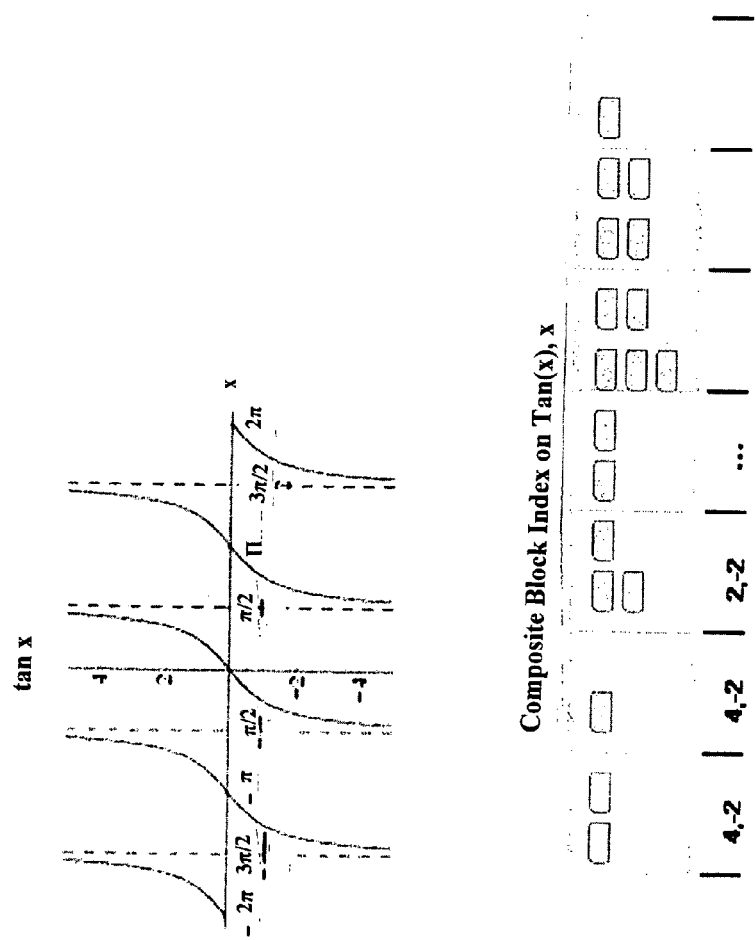
FIG. 2 is a schematic diagram of an exemplary PPM function with a pre-defined number of periods.

For these functions, the period number is $x/(\pi/2)$, where x is the value of the base column. In FIG. 2, an example of F(x)=tan(x) is shown. The index should maintain the values of F(x) together with the annotation of the period number $x(\pi/2)$. The construction of the index will be on F(x)=tan(x), for example: ORGANIZE BY TAN (x)→(ORGANIZE BY TAN (x), x/($\pi/2$))

The following have undefined and/or unlimited number of periods:

| MONTH (date) | p = year |
|---|---|
| QUARTER (date) | p = year |
| MOD (x) | p = x |
| DAYOFYEAR | p = year |
| HOUR | p = 24 |
| DAYOFWEEK | p = 7 |

These functions are different than the previously mentioned functions, in that the number of periods is unbounded and depends on the base data. When the periodicity can be calculated by a function such as YEAR (date) (rather than being constant), it is possible to use these functions to enforce the mapping of the domain into monotonic ranges.

Figure 3:
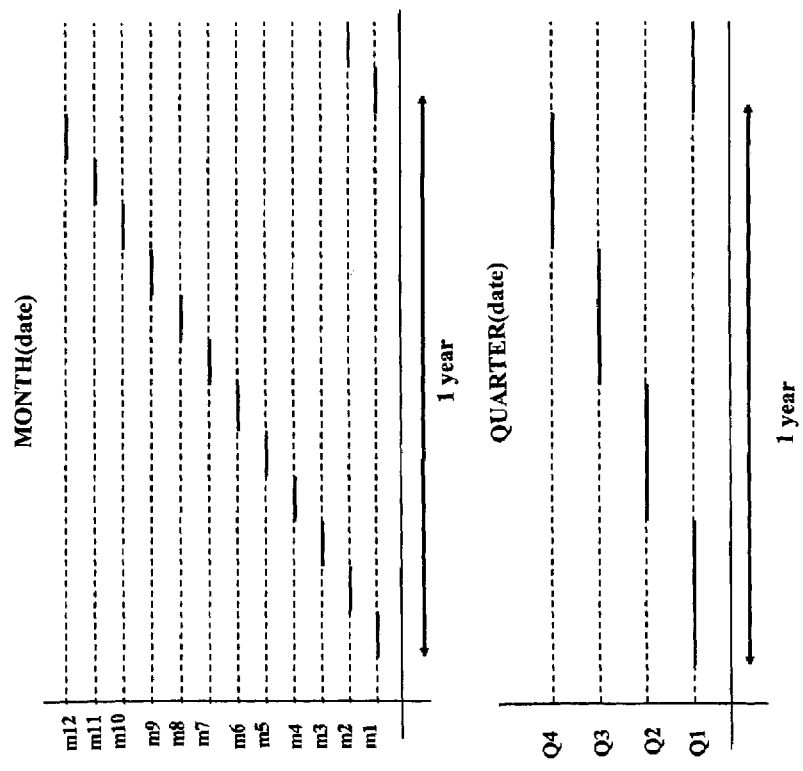
FIG. 3 is a schematic diagram of an exemplary PPM function with an unlimited number of periods.

In FIG. 3, examples of F(x)=MONTH(date) and QUARTER (date) are shown. In the case MONTH, for example, the period will be one year and the period number will coincide with the YEAR (date). The construction of the index would use the following exemplary annotation:

ORGANIZE BY MONTH (date)→(ORGANIZE BY MONTH (date), YEAR (date))

The following is an overview of the index construction steps and the corresponding queries.

Index construction begins by recognizing PPM functions and their periodicity. This may be accomplished from explicit user input, from recognizing semantically that the function is known to be PPM (such as sin (x), month (date)), or from observation (verify the relationship between the values of the based and derived columns).

An index is built over the PPM function, with the annotation of the period number, and an index is maintained with updates to the base columns, which also generates updates to the derived columns. If the derived column is known to be PPM by observation, at each update the relationship should be verified to hold. If it does not hold, then either that current index is deleted and an index over both columns is created, or the existing index may still be used for the correct PPM intervals and additional data structures or retrieval would be necessary for the non-PPM intervals.

For a query rewrite, the range and point queries in terms of a base column can now be answered in terms of the derived columns, if the derivation function is PPM, and the value on the base column x to F(x) and the period number to x/(period size) needs to be transformed.

For generality, PPM functions can be described as F(f) instead of F(x), where f is a function over base data. Recall that when a PPM function is described as F(x), it is assumed that x is the base data. In order to maintain the properties of PPM, the requirement that f in F(f) is monotonic with respect to the base data must be imposed. For MDC, a subset of the monotonic functions can be checked, but the checking module should be reused. For simplicity, the notation of F(x) will be used herein, however note that notation can be replaced with F(f) when f is monotonic, for example, SIN(x+y), where x and y are from base columns.

To enforce the splitting of the function domain such that only monotonic ranges can be accessed, simple indexes should be rewritten as composite indexes.

The base values x that are used for function F(x) in the generated expression are mapped to period numbers according to their assignment into periods. As noted, the periods may be constant or inferred, in which case the number of periods is data-dependent. For example, the number of periods for F(x)=tan(x) is $4\pi/(\pi/2)$, that returns 8. If F(x)=MONTH(x), then the period is "year" and the number of years included in the index depends on the data inserted.

In either case, the ORGANIZE BY statement is modified, to force the index on the derived column to separate the domain according to periods.

ORGANIZE BY (F(x))→ORGANIZE BY (F(x), x/p)

For inferred periods, there are functions that calculate x/p already such as YEAR( ), so those can be used as well.

ORGANIZE BY (F(x))→ORGANIZE BY (F(x), f(p))

Same as in derived predicates for monotonic functions, the derived predicates are stored as additional information about the columns. The derived predicates include equality and "in" predicates and inequality predicates.

Equality and "in" predicates include:
flag the new predicate as derived, and
let an encapsulator evaluate the expression for both dimensions of the composite index.

By way of example, where day=d→where MONTH=MONTH(d) and YEAR=YEAR(d) and where radians=$\pi$→where SIN($\pi$) and RADIANS=RADIANS($\pi$).

Inequality predicates include:
conditions on the references columns
C1 appears in the predicate with a constant value
the deriving function is PPM, and
all other columns appear in equality predicates with constant values.

Figure 4:
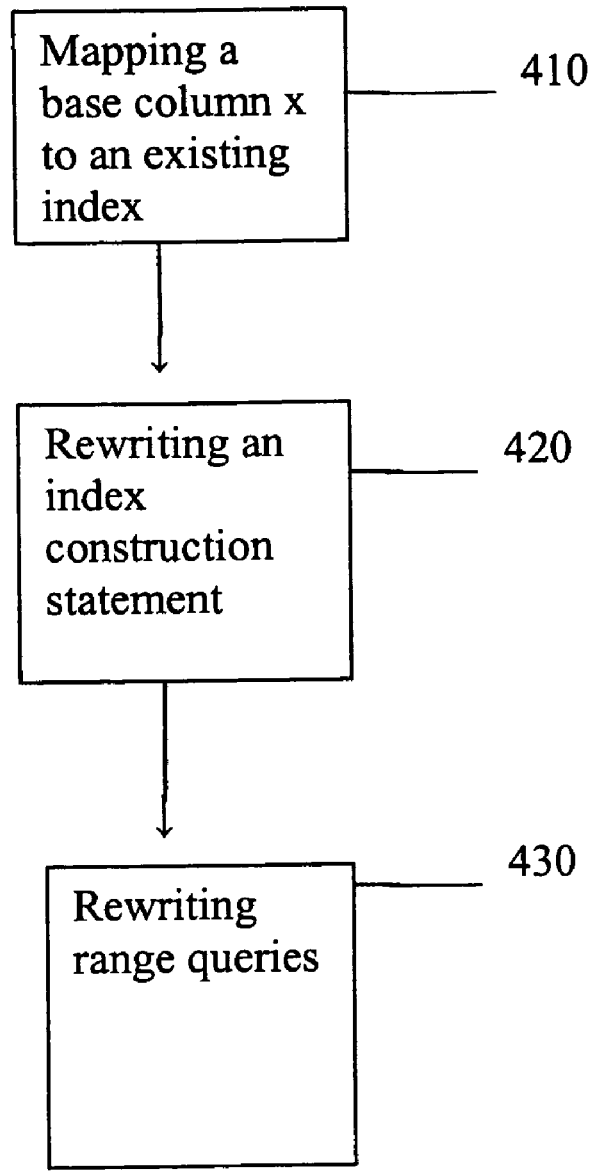
FIG. 4 is a flowchart of a method 400 for accelerating range queries in accordance with an exemplary embodiment of the present invention.

Accordingly, FIG. 4 illustrates an exemplary method 400 for accelerating range queries using periodic monotonic properties of non-monotonic functions, in accordance with certain exemplary embodiments of the present invention. The method includes mapping 410 a base column x to an existing index on a column y that is correlated with column x through a periodic piecewise monotonic function F(x), rewriting 420 an index construction statement to force the existing index on column y to track a periodic piecewise monotonic property by assigning identical values of F(x) to different periods to different ranges to create an annotated index, and rewriting 430 range queries over the annotated index on F(x) by modifying a derived predicate.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A computer implemented method for accelerating range queries using monotonic properties of non-monotonic functions, comprising:
at least one processor for executing the steps of:
mapping a base column x to an existing index on a column y that is correlated with column x through a piecewise monotonic function F(x);
rewriting an index construction statement to force the existing index on column y to track a piecewise monotonic property by assigning identical values of F(x) to different periods to different ranges to create an annotated index;
rewriting range queries over the annotated index on F(x) by modifying a derived predicate,
constructing said existing index;
wherein said constructing said existing index comprises:
recognizing said piecewise monotonic function and a periodicity of said piecewise monotonic function; and
building an index over the monotonic function,
wherein said recognizing said piecewise monotonic function is accomplished from explicit user input, recognizing semantically that a function is known to be a piecewise monotonic function and verifying a relationship between values of the base column x and an a derived column, and
wherein during said building an index over the monotonic function if a derived column is known to be a monotonic function by observation, at each of a plurality of updates a relationship should be verified.

* * * * *